United States Patent [19]
Barger

[11] Patent Number: 5,155,550
[45] Date of Patent: Oct. 13, 1992

[54] ACCURATE CORRELATOR OF ROTATIONAL AND TRANSLATIONAL MOTIONS AND CONTROL METHOD AND APPARATUS

[76] Inventor: R. L. Barger, 2420 Newcastle Ave., Cardiff by the Sea, Calif. 92007

[21] Appl. No.: 698,118

[22] Filed: May 10, 1991

[51] Int. Cl.$^5$ .............................................. G01B 9/02
[52] U.S. Cl. .................. 356/345; 356/351; 356/358; 356/346; 250/225
[58] Field of Search ............... 356/351, 358, 349, 345, 356/346, 352; 250/225; 372/29, 32

[56] References Cited

U.S. PATENT DOCUMENTS

| | | | |
|---|---|---|---|
| 3,635,552 | 1/1972 | De Lang | 356/351 |
| 4,688,934 | 8/1987 | Clark | 356/364 |

OTHER PUBLICATIONS

A. M. Title et al., "Improvements in Birefringent Filters. 6: Analog Birefringement Elements", Applied Optics, vol. 19, No. 12, Jun. 1980, pp. 2046–2071.

G. C. Bjorklund, "Frequency-modulation Spectroscopy: A New Method for Measuring Weak Absorptions and Dispersions", Optics Letters, vol. 5, No. 1, Jan. 1980, pp. 15–17.

C. B. Carlisle, et al., "Quantum Noise-Limited FM Spectroscopy with a Lead-salt Diode Laser", Applied Optics, vol. 28, No. 13, Jul. 1989, pp. 2567–2576.

J. L. Hall et al., "Optical Heterodyne Saturation Spectroscopy", Applied Physics Letters, vol. 39, No. 9, Nov. 1980, pp. 680–682.

Primary Examiner—Samuel A. Turner
Assistant Examiner—Richard E. Kurtz
Attorney, Agent, or Firm—Brown, Martin, Haller & McClain

[57] ABSTRACT

A beam retarder positioned in the path of a superimposed linearly polarized working beam and an orthogonal linearly polarized reference beam, where the working beam and the reference beam have travelled over different optical paths, converts the linearly polarized superimposed working beam and reference beam components into circularly polarized beam components having opposite hands. A rotatable analyzer projects an analyzed beam having phase characteristics determined by the rotational orientation of the analyzer and by the optical path difference between the reference beam and the working beam. A radiation sensitive detector detects changes in intensity of the analyzed beam that are related to the beat frequency and phase of the analyzed beam. Signal processor apparatus relate the phase of the beat frequency to the rotation of the analyzer to adjust the variable path length traveled by the working beam.

15 Claims, 6 Drawing Sheets

ACCURATE CORRELATOR OF ROTATIONAL AND TRANSLATIONAL MOTIONS AND CONTROL METHOD AND APPARATUS

BACKGROUND OF THE INVENTION

1. Field of the Invention

This invention relates to methods and apparatus for correlating rotational and translational motions, and, more specifically, to methods and apparatus for correlating the rotation of a linear polarization analyzer with the precise and accurate linear translation of a moveable mirror.

2. Brief Description of the Prior Art

There are many circumstances or situations in which it is desirable to measure and control very accurately and precisely the angular rotation or the linear translation of one or more objects. Numerous laser apparatus, which produce intense beams of coherent monochromatic light, have been used quite successfully for relatively accurate detection and alignment applications. Unfortunately, however, there is a need for even more accurate measuring and control capability to detect and control even more minute changes than possible with present laser and other devices for many applications, including improving the performance of interferometers, optical nanolithography for manufacturing semiconductor components, and for providing accurate, step-wise rotational control for fabricating circular optical encoders.

SUMMARY OF THE INVENTION

Accordingly, it is an object of the present invention to provide a novel, highly sensitive and accurate method and apparatus for correlating rotational and translational motions for measuring and controlling objects.

It is also an object of the present invention to provide a method and apparatus for detecting changes in rotation of a linear analyzer and correlating them into minute translational changes of an object.

Additional objects, advantages, and novel features of this invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purposes of the present invention, as embodied and broadly described herein, the method and apparatus according to this invention utilizes light beams and beat frequency interference phenomena to produce precise and accurate correlation between rotational and translational motions. More specifically, the apparatus utilizes a working beam of linearly polarized coherent radiation having a variable optical path length and a reference beam of linearly polarized coherent radiation having a fixed optical path length, wherein the working beam and the reference beam are superimposed, have different frequencies, and orthogonal linear polarizations to produce precise and accurate correlation between rotational and translational motions. The apparatus includes a beam retarder positioned in the path of the superimposed linearly polarized working beam and linearly polarized reference beam for converting the linearly polarized superimposed beam components into a circularly polarized beam components having opposite hands. A rotatable analyzer projects an analyzed beam having phase characteristics determined by the rotational orientation of the analyzer and by the optical path difference between the reference beam and the working beam. A radiation sensitive detector detects changes in intensity of the analyzed beam that are related to the beat frequency and phase of the analyzed beam. Signal processor apparatus relate the phase of the beat frequency to the rotation of the analyzer to adjust the variable path length traveled by the working beam.

The method of this invention includes the steps of converting a linearly polarized working beam into a circularly polarized working beam and converting the linearly polarized reference beam into a circularly polarized reference beam such that the circularly polarized working and reference beams have respective oppositely oriented circular polarizations, i.e., one having left handed circular polarization and the other having right handed circular polarization. The oppositely oriented circularly polarized working and reference beams are then analyzed to produce an analyzed beam having an intensity that changes at a beat frequency and has a shifted phase. This phase shift is determined by the optical path length of the working beam in relation to the optical path length of the reference beam and is also determined by the rotational orientation of the rotatable analyzer.

An alternate embodiment uses the same components to relate the step-wise tuneable length of a Fabry-Perot cavity to control the step-wise rotation of a linear polarizer for fabricating a circular optical encoder.

BRIEF DESCRIPTION OF THE DRAWINGS

The accompanying drawings, which are incorporated herein and form a part of the specification illustrate preferred embodiments of the present invention, and together with the description, serve to explain the principles of the invention. In the drawings.

DETAILED DESCRIPTION OF THE PREFERRED EMBODIMENT

Figure 1:
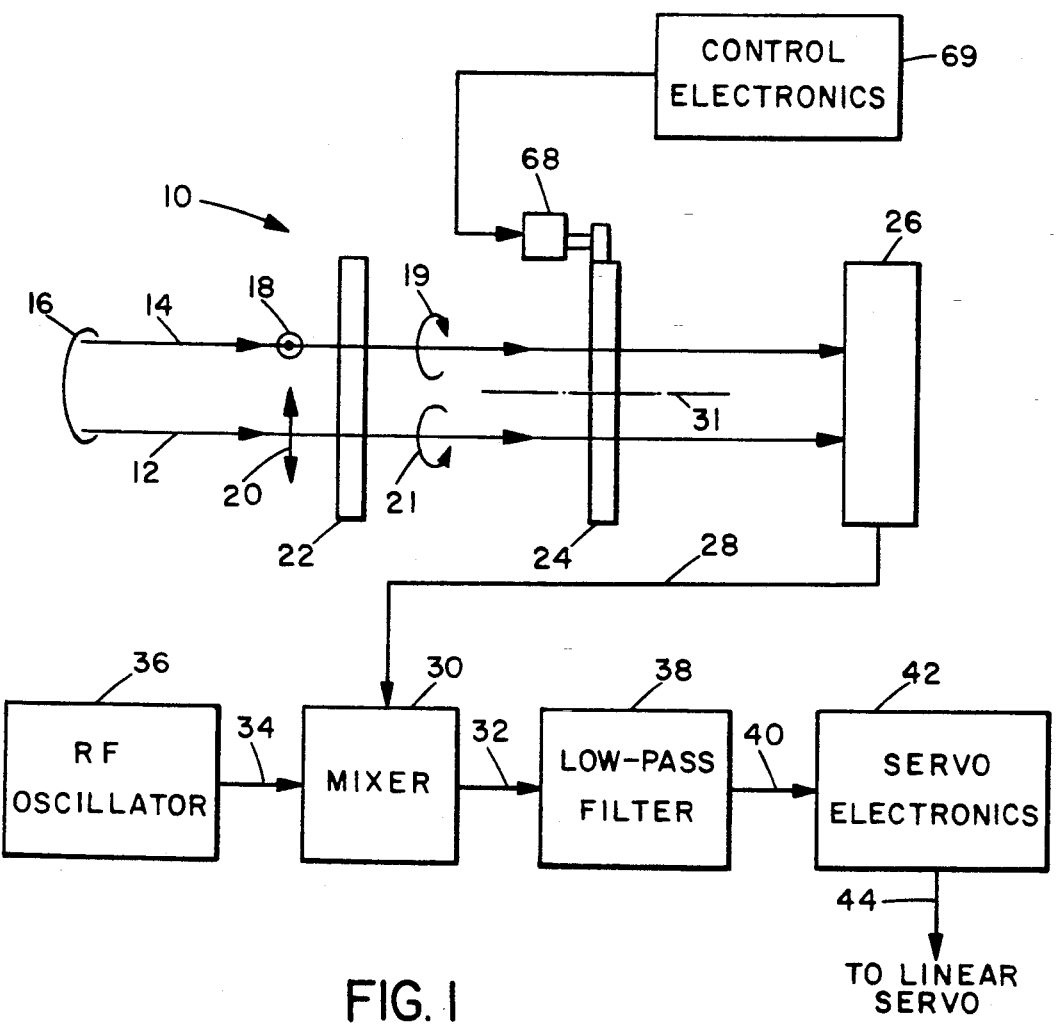
FIG. 1 is a schematic diagram of the rotational and translational motion and control apparatus of the present invention separately showing the superimposed reference beam and working beam components and their respective linear and circular polarizations.

The rotational and translational motion and control apparatus 10 according to this invention is shown in FIG. 1 as it could be used to detect optical interference between two linearly polarized light beams 12 and 14 to accurately and precisely correlate the rotation angle of the linear polarizer 22 with the optical path difference between the two beams 12 and 14. For the purpose of providing a clear and easy to follow description, the motion and control apparatus 10 of the present invention will be first briefly described for a generic application. Then, after having described the motion and control apparatus 10 generically, detailed descriptions will be given for the example applications and alternative embodiments shown in FIGS. 3-7.

Referring now to FIG. 1, an optical beam 16, comprising two superimposed and coherent beam components, namely reference beam 12 and working beam 14, are incident on retarder 22. While the respective beam components 12 and 14 are depicted as being in parallel, spaced apart relation from each other for ease in illustrating their respectively different polarizations, they are actually superimposed on each other and travel along a common optical path with a common optical beam axis into retarder 22. However, as will be described in detail below, prior to being combined into a common optical beam 16, the reference beam component 12 was physically separated and traveled over a fixed optical path having a constant path length before being incident on retarder 22, while the working beam component 14 traveled over an optical path that has a variable length before being incident on retarder 22. Also as will be described in detail below, reference beam component 12 has a frequency of $\omega$, while the working beam component 14 has a slightly higher frequency of $\omega+\Omega$. Further, reference beam component 12 is linearly polarized in a first plane, which is represented by the transverse arrow 20 in FIG. 1 as being in the plane of the paper, while the working beam component 14 is linearly polarized in a second plane that is orthogonal to the first plane, which is represented by the encircled dot 18 in FIG. 1 as being orthogonal to the plane of the paper.

These superimposed, orthogonally linearly polarized beam components 12 and 14 pass through the quarter wave retarder plate 22, which converts them to respectively oppositely oriented circularly polarized beam components, as indicated by the oppositely directed circular arrows 19, 21. For example, the working beam component 14 may be circularly polarized with a left hand orientation 19, while the reference beam component 12 may be circularly polarized with a right hand orientation 21. The beam 16 is then passed through a rotatable linear polarizer or analyzer 24, which transmits the beam 16 in the form of a linearly polarized waves with the phase shift between the beam components 12 and 14 before they are incident on the detector 26. The magnitude of the phase shift is a function of the angular rotation of the linear polarizer or analyzer 24. At the detector 26, optical interference occurs between the two beams 12 and 14 to produce an optical beat signal 84 with a frequency $\Omega$ and a phase shift $\Phi$, as shown in FIG. 2 and described in more detail below.

This phase shift $\Phi$ of the optical beat signal 84 is determined by the optical path difference between the beams 12 and 14 and by the relative angular orientation of the rotatable linear polarizing device or analyzer 24, as will also be described in detail below. Since the phase shift $\Phi$ is determined by the optical path difference between the reference beam 12 and the working beam 14, as well as by the relative angular orientation of the rotatable linear analyzer 24, the method and apparatus according to this invention provides an accurate correlation of the optical path difference between the reference beam 12 and the working beam 14 with the rotation of analyzer 24. A change in phase $\Phi$ due to an optical path change of $\lambda$ is canceled by a change of $\pi$ radians in the relative angular orientation of the analyzer 24, as will be described below. By processing the output signal from the detector 26 with an input from an RF oscillator 36 into a mixer 30 and through a low pass filter 38 and suitable servo electronics 42, as will be described in more detail below, and by connecting suitable servo apparatus 68, 69 (FIG. 1) to the rotatable analyzer 24 and to a mirror 62 (not shown in FIG. 1, but shown later in FIGS. 3-7) positioned in the optical path of the working beam 14 for changing the length of that optical path, the path length of working beam 14 can be precisely controlled.

Figure 2:
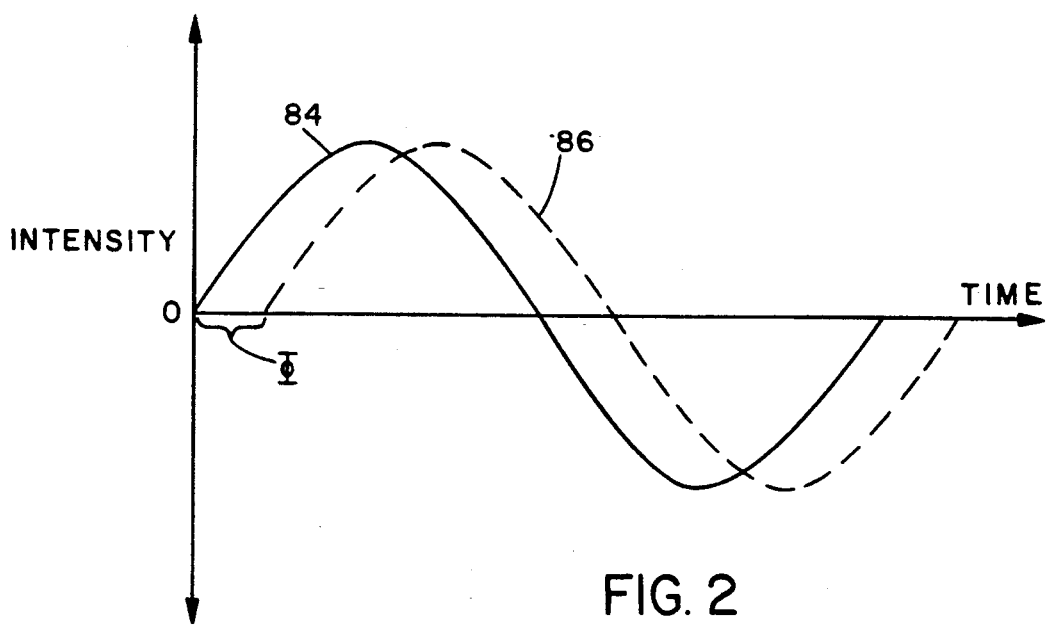
FIG. 2 is a graph of the intensity of the optically interfering superimposed beam components as they are incident on the radiation detector, showing the beat frequency and phase shift.
Figure 3:
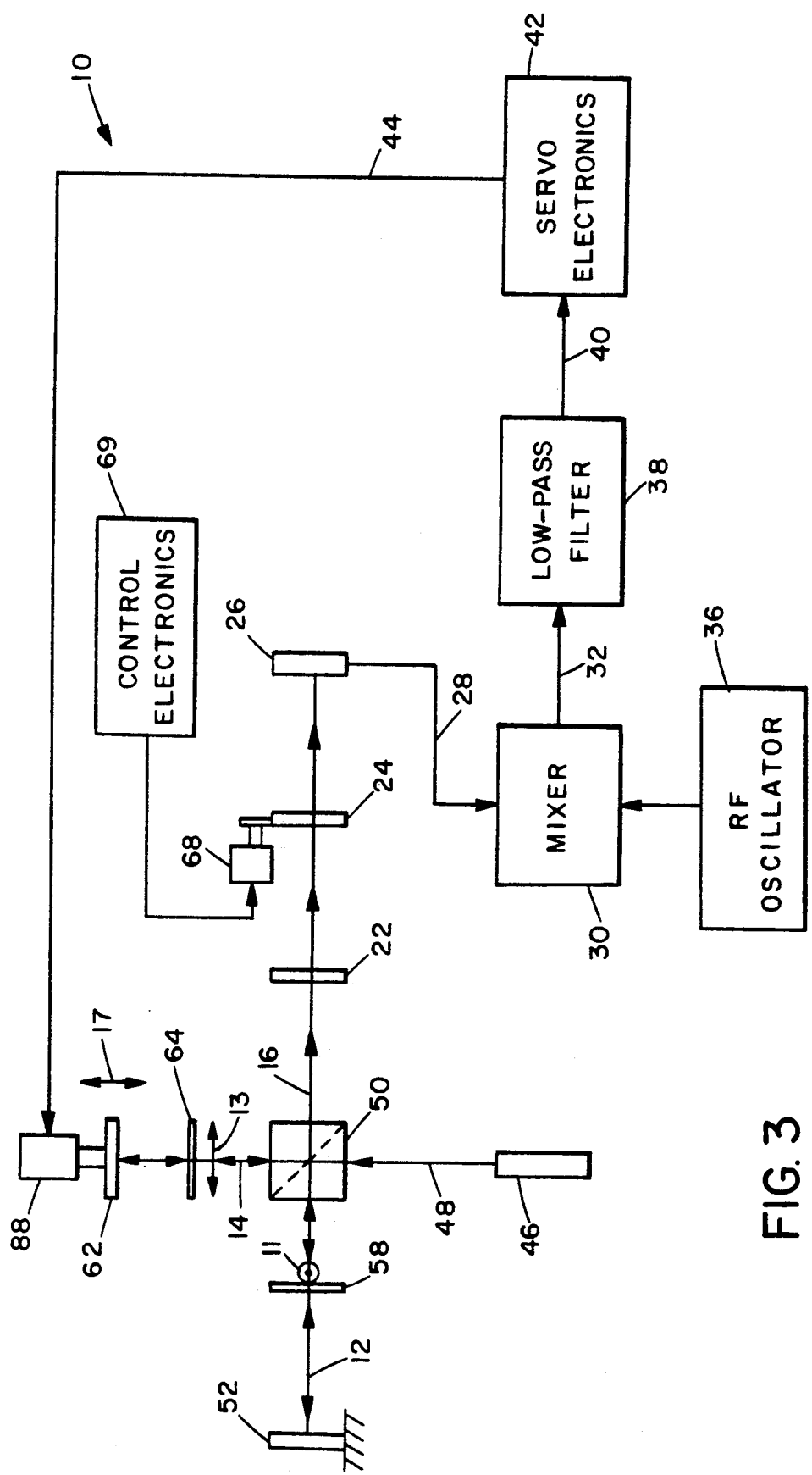
FIG. 3 is a schematic diagram of a generic application of the rotational and translational motion and control apparatus of the present invention showing the relevant optical paths and polarization orientations of the reference beam and the working beam.

Referring now to FIG. 3, but with occasional reference to FIG. 2, the motion and control apparatus 10 of the present invention is described in detail as it could be used to precisely control the linear position of a moveable mirror 62 in the path of the working beam 14. This moveable mirror 62 may be part of an optical device, or may be an integral part of some other component, the position of which component will then be accurately and precisely controlled by the rotational and translational motion and control apparatus 10 of the present invention.

As was briefly described above, this invention correlates the rotation of a linear analyzer 24 with the translation of moveable mirror 62, such that rotating linear polarizer or analyzer 24 by a certain angular amount results in extremely small displacement of moveable mirror 62. In fact, the "scale factor" achieved by this invention is extremely high. For example, rotating the linear analyzer 24 by $\pi$ radians ($\frac{1}{2}$-turn) will cause linear actuator 88 to move mirror 62 a distance of $\frac{1}{2}$-wavelength, as will be explained in detail below. Obviously, since the wavelength of light typically used by this invention is on the order of a few hundred nanometers, the motion and control apparatus 10 of this invention allows extremely small displacements of mirror 62 to be realized by rotating linear analyzer 24 through relatively large, thus easily controlled, angles.

While the motion and control apparatus 10, as well as the additional embodiments shown and described herein, utilize a source of coherent plane wave electromagnetic radiation, such as laser 46, to generate the reference beam component 12 and working beam component 14, numerous other electromagnetic radiation sources, such as microwave transmitters, could be used just as easily. However, for convenience, this description will refer to a laser radiation source producing light in the visible spectrum, since it is preferred and is very practical and accurate in most applications.

A radiation source, such as laser 46 shown in FIG. 3, projects a light beam 48 that comprises two optically distinct superimposed portions or beams, namely reference beam 12 and working beam 14, which are linearly polarized in respective orthogonal planes and have slightly different frequencies, so that they will interfere to produce a beat frequency, as will be described below. More specifically, the reference beam 12 and working beam 14 have relatively high frequencies $\omega$. Suitable oscillator apparatus (not shown in FIG. 3, but shown in the alternate embodiments illustrated in FIGS. 4–7) can be connected to radiation source 46 to increase the frequency of one of the beam components, for example, the working beam 14, by a relatively small amount $\Omega$, as will be described below. Note, however, that other apparatus besides oscillator apparatus could be used to change the frequency of the working beam 14 in relation to the reference beam 12, as would be obvious to persons having ordinary skill in the art after becoming familiar with the details of this invention. Therefore, the present invention should not be considered as limited to using oscillator apparatus to change the frequency of the working beam 14. As mentioned above, suitable polarizing and orienting apparatus for producing beam components 12 and 14 linearly polarized in respective planes that are orthogonal to each other are also are well-known, and the use of such apparatus with a laser radiation source 46 would also be obvious to persons having ordinary skill in the art after becoming familiar with the details of this invention. Accordingly, such persons should be able to provide and use such apparatus without the need to have them shown and described here.

A polarizing beam splitting cube 50 separates the reference beam 12 and the working beam 14 from beam 48 by reflecting reference beam 12, which is illustrated as being polarized perpendicular to the plane of the paper, as indicated by encircled dot 11, and by transmitting working beam 14, which is illustrated as being polarized in the plane of the paper, as indicated by transverse arrow 13. Reference beam 12 is directed to stationary mirror 52 via a first ¼-wave retarder 58. Stationary mirror 52 reflects reference beam 12 back along its original path, through ¼-wave retarder 58 and to polarizing beam splitter cube 50. The ¼-wave retarder plate 58 converts the polarization of beam 12 to circular on the first pass and then to orthogonal linear on the second pass, so that the plane of polarization of reference beam 12 is effectively "rotated" 90° by the time reference beam 12 returns to polarizing beam splitter 50, which is a characteristic of ¼-wave retarder plates, such as retarder plate 58. Since reference beam 12 is now polarized in the plane of the paper, i.e., orthogonal to its original orientation, it will be transmitted by cube 50 as beam 16 toward a third ¼-wave retarder 22. In a similar manner, working beam 14 passes through a second ¼-wave retarder 64 before being reflected by moveable mirror 62. The second ¼-wave retarder 64 also effectively rotates the polarization angle of working beam 14 90° after two passes, so that it is reflected by cube 50 and recombined with reference beam 12 to form combined beam 16.

The details of the apparatus used to detect the relative difference between the path lengths traveled by reference beam 12 and working beam 14, as well as the details of how this path length difference can be controlled by rotating linear polarizer 24, are best seen by referring to FIGS. 1, 2, and 3 simultaneously. Essentially, the individual beam components 12 and 14 of combined beam 16 pass through the third ¼-wave retarder 22, which converts the respective polarization states of working beam 14 and reference beam 12 from orthogonal linear, as indicated by encircled dot 18 and arrow 20 in FIG. 1, to right and left circular, as indicated by arrows 19 and 21, respectively. For each component beam 12, 14 of beam 16, the rotatable linear analyzer 24 transmits the instantaneous projections of the fast and slow components, i.e., those components parallel and orthogonal to the fast axis 70 (shown in FIG. 4 and described below) of retarder 22, of the respective polarizations of beams 12, 14. The magnitudes of the fast and slow components of the respective beams transmitted by linear analyzer 24 depend on the particular angular orientation of the transmission axis of analyzer 24 with respect to the fast axis of retarder 22, as will be further explained below. Thus, rotation of the linear analyzer 24 advances the phase of one transmitted wave and retards the phase of the other, resulting in an overall phase shift $\Phi$ of the beat signal 84, as illustrated in FIG. 2.

It is well-known that when two waves of different frequencies are mixed, they reinforce each other at some points and oppose each other at others. This reinforcement and opposition of the instantaneous amplitudes produces a wave having a varying amplitude, which varying amplitude oscillates at a frequency that is exactly equal to the difference between the respective frequencies of the original waves. For example, if a 10 Hz wave is mixed with an 8 Hz wave, the two waves interfere to produce a wave whose amplitude varies at a rate of 2 Hz, which is the beat frequency. Accordingly, beams 12 and 14 interfere in an identical manner to produce an intensity variation 84, as seen in FIG. 2. This intensity variation 84 varies with time at a beat frequency $\Omega$ that is identical to the frequency difference $\Omega$ between beams 12 and 14. Note that only the difference, or beat, frequency $\Omega$ (and not the high frequency $\omega$ of the light waves themselves) is shown in FIG. 2 for clarity.

Essentially, then, radiation detector 26 generates an electric output signal 28 that is indicative of the intensity variation 84 in the beam 16 shown in FIG. 2. Actually, detector 26 converts the intensity variation 84 of FIG. 2 caused by the interference of beams 12 and 14 into an electrical signal 28 not only having the same beat frequency $\Omega$ as the intensity variation 84, but also having the same phase shift $\Phi$ of the intensity variation 84. That is, the intensity variation 84 is modulated at the beat frequency $\Omega$ and has a shifted phase $\Phi$ with respect to a reference wave 86 having the same frequency $\Omega$, but constant, unchanging phase. As will be explained in more detail below, this phase shift $\Phi$ is determined by the change in path length traveled by working beam 14 as well as the angular orientation of linear analyzer 24. Therefore, information about either the change in path length traveled by beam 14 or the angular orientation of the linear analyzer 24 can be derived from information about the phase shift $\Phi$.

Referring again to FIGS. 1 through 3 simultaneously, a mixer 30 mixes or blends the signal 28 from detector 26 with a signal 34 generated by RF oscillator 36 having the same frequency as beat frequency $\Omega$, but having a constant, unshifting phase. The signal 34 produced by RF oscillator 36 thus serves as the constant phase reference wave 86 shown in FIG. 2, while the actual signal 28 from detector 26 is shown as wave 84 in FIG. 2. Accordingly, the DC signal 32 produced by mixer 30 is proportional to the phase shift $\Phi$ of the beat frequency. Low pass filter 38 removes any remaining traces of the beat frequency signal from the DC signal 32, which results in a filtered DC signal 40, the magnitude of which is proportional to the phase shift 101. Servo electronics 42 then process filtered DC signal 40 and generate a servo signal 44 suitable for driving linear actuator 88, which is connected to moveable mirror 62, in the direction indicated by arrow 17 in FIG. 3. Linear actuator 88, therefore, imparts linear translational movement to mirror 64, thus changes the path length of working beam 14, in response to the DC signal 40 that results from the phase shift $\Phi$.

Since the magnitudes of the fast and slow components of the reference beam 12 and working beam 14 transmitted by linear analyzer 24 depend on the particular angular orientation of analyzer 24, changing the angular orientation of analyzer 24 changes the phase shift $\Phi$ of the beat frequency of the intensity variation 84 produced by the two beams 12 and 14. This changed phase shift $\Phi$ is detected by servo electronics 42, which activate linear actuator 88 to move mirror 62, as will be described below. The servo electronics 42 are designed in accordance with well-known principles, such that the electronics 42 will cause actuator 88 to move mirror 62 until the phase shift $\Phi$ returns to its original value. Finally, since it is desired to precisely control the linear position of mirror 62, suitable control electronics 69 and actuator 68 are employed to precisely and repeatably control the angular orientation of analyzer 24.

In the preferred embodiment, the beat signal frequency $\Omega$ is in the range of about 10 to 100 MHz (i.e., $1 \times 10^7$ Hz to $10 \times 10^7$ Hz), whereas the frequency $\omega$ of the light beams are typically in the range of about $4 \times 10^{14}$ Hz to $8 \times 10^{14}$ Hz for visible light.

The function of the $\lambda/4$ plate 22, as indicated above, is to convert the polarization states of the reference beam component 12 and the working beam component 14 from orthogonal linear to respective right 21 and left 19 circular polarized beam components by introducing a phase difference of $\lambda/2$ radian to wave components transmitted along the fast and slow axes of the plate 22. These respective right 21 and left 19 circular polarized components 12 and 14 of beam 16 that are then input to the linear polarizer or analyzer 24. For each of these input beam components 12 and 14, the linear polarizer 24 then transmits the instantaneous projections of the fast and slow components on the transmission axis of linear polarizer 24. The vector addition of the two projections results in a wave that is linearly polarized along the transmission axis of linear polarizer 24 for both the reference component 12 and the working component 14, with the relative phases of these waves determined by the instantaneous projections, i.e., by the angle $\theta$, which is best illustrated by the perspective view of the linear polarizer 24 in FIG. 4 as the angle that transmission axis 66 of linear polarizer 24 makes with the fast axis 70 of retarder plate 22. Rotation of the transmission axis 66 of linear polarizer 24, as indicated by arrow 92 in FIG. 4, advances the phase of one of the transmitted wave components 12 and 14 and retards the phase of the other, resulting in the phase shift $\Phi$ of the RF beat signal.

The amplitudes $A_{12}$ and $A_{14}$ of each beam component 12, 14, respectively, at the detector are equal to the sum of amplitudes of the projections of the fast and slow components from each beam component 12, 14. Accordingly, this analyzer system gives amplitudes $A_{12}$ and $A_{14}$ for each beam component 12, 14, as follows:

$$A_{12} = e^{i(\omega t - kR)} \cos \theta + i e^{i(\omega t - kR)} \sin \theta$$

$$A_{14} = -e^{i[(\omega + \Omega)t - kW]} \cos \theta + i e^{i[(\omega + \Omega)t - kW]} \sin \theta$$

where $k = 2\pi/\lambda$ is assumed to be the same for the nearly-equal frequency optical waves, since the beat frequency $\Omega$ is seven (7) orders of magnitude less than the frequency of the light beams $\omega$. Finally, R and W are the path lengths of the reference and working beams, respectively. $\theta$, as stated above, is the angle that transmission axis 66 of linear polarizer 24 makes with fast axis 70 of retarder 22. See FIG. 4 for a perspective illustration of $\theta$ in relation to retarder 22.

Figure 4:
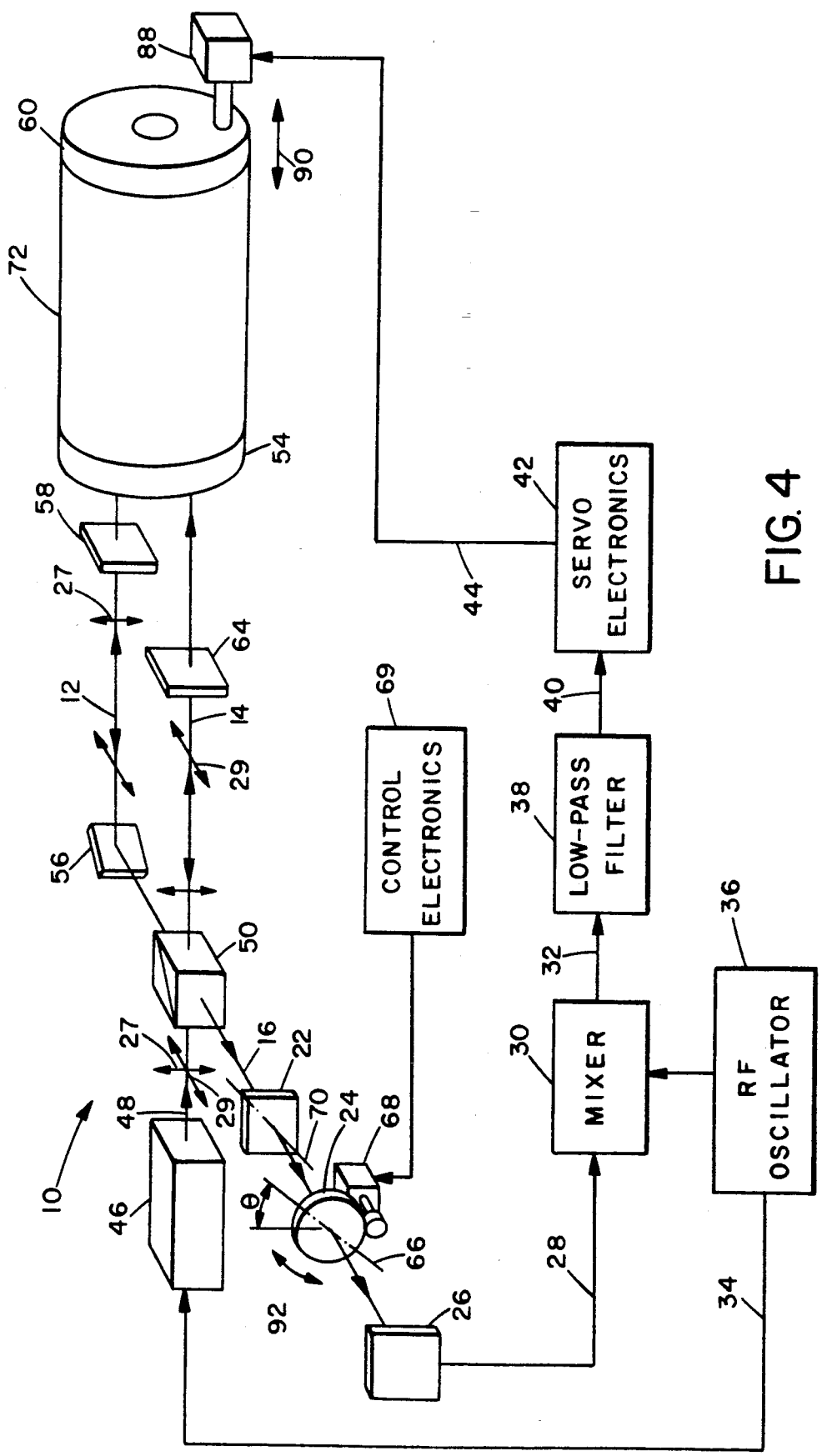
FIG. 4 is a perspective view in schematic of the rotational and translational motions and control apparatus of the present invention being used to control the length of a Fabry-Perot optical cavity.

It follows, then, that the intensity of the light falling on the detector 26 is the product of the sum of the amplitudes with the sum's complex conjugate:

$$I = I_{max} 2[1 - \cos(\Omega t + k\Delta x - 2\theta)]$$

where $\Delta x$ is the optical path difference $(W - R)$ and $I_{max}$ is the maximum intensity of the combined beams 12 and 14. Thus, the intensity of the light incident on detector 26 is modulated at the RF beat frequency $\Omega$, with the phase $\Phi$ of the modulation (FIG. 2) determined by the optical path difference $\Delta x$ and the angle $\theta$ that the transmission axis 66 makes with the fast axis 70 of retarder 22 (FIG. 4).

Referring now to FIGS. 1, 2, and 3, a DC signal 32 proportional to the modulation phase shift $\Phi$ is obtained by mixing in the mixer 20 the detector signal 28 with a signal having a frequency of $\Omega$ and a constant phase, such as the signal 34 from RF oscillator 36. This signal 34, therefore, functions as the reference wave 86 shown in FIG. 2, as described above. The output signal 32 from mixer 30 is then transmitted to the low-pass filter 38, to give the DC signal 40 of the following characteristic:

$$S - S_{max} \cos(k\Delta x - 2\theta + \Psi)$$

where $\Psi$ is the constant phase of the RF oscillator signal 34. $S_{max}$ represents the maximum signal strength. Accordingly, if the linear analyzer 24 is rotated via control electronics 69 and actuator 68 to change its relative angular orientation $\theta$, there will be a change in the phase shift $\Phi = k\Delta x - 2\theta$ of the beat frequency signal 28. This change in phase shift $\Phi$ is converted into a change in the DC signal 32 by mixer 30 and is detected by the servo electronics 42, as described above. The servo electronics 42 are designed to actuate linear actuator 88, thus moving mirror 62 as indicated by arrow 17 just enough to return the phase shift $\Phi$ back to its original value.

The optical path difference $(W - R)$ between the reference beam 12 and the working beam 14 and the rotation angle $\theta$ of analyzer 24 are correlated in the phase shift $\Phi$ of the DC servo signal 44, with a change in phase $\Phi$ due to an optical path length change of $\lambda$ (i.e., a change in reflecting mirror 62 position of $\lambda/2$) being canceled by a change of $\pi$ for the angle $\theta$ of linear analyzer 24. Therefore, the mirror 62 translation is accurately controlled by rotating the analyzer 24 with the scale factor:

$$\frac{\delta L}{\lambda/2} = \frac{\delta \theta}{\pi}$$

Thus, a rotation of the linear analyzer 24 through $\pi$ radians results in a one fringe translation (i.e., $\lambda/2$). Advantageously, there is in principle no limit to the translation achievable with the linear servo 88, since continuous analyzer rotation through n π radians results in a mirror translation of nλ/2.

The method described above will also work with light beams 12, 14 of the same frequency, giving a DC signal directly from the detector 26. However, by obtaining the signal 28 at an RF frequency, as used above, the method has the advantages found in RF spectroscopy techniques, i.e., near elimination of systematic errors introduced by such low frequency parameters as laser intensity noise and DC electronic drift.

In operation, then, the optical path difference between the working beam 14 and the reference beam 12 caused by changing the position of moving mirror 62 is now related to, or correlated with, the rotation of the linear analyzer 24. As explained above, using control electronics 69 and actuator 68 to rotate analyzer 24 will cause a change in the phase shift Φ of the intensity variation 84 (FIG. 2). This phase shift change is detected by detector 26 and processed by servo electronics 42, such that the servo electronics 42 will activate linear actuator 88 to move mirror 62 until the phase shift Φ returns to its original value. Accordingly, the method and apparatus of this invention can be used for translating the relatively large rotation of the linear analyzer 24 to the extremely small, precise, and accurate linear position of moving mirror 62. For example, for a working beam 14 having a given wavelength λ, typically in the range of 400 to 700 nm for visible light, rotating the linear analyzer 24 by ½ turn (π radians) results in a linear change in the optical path traveled by beam 14 of exactly one-half wavelength λ/2, an extremely small amount. The linear actuator 88 for moving the mirror 62 can be a piezoelectric crystal or any other suitable actuator that moves an object over very minute distances.

Figure 5:
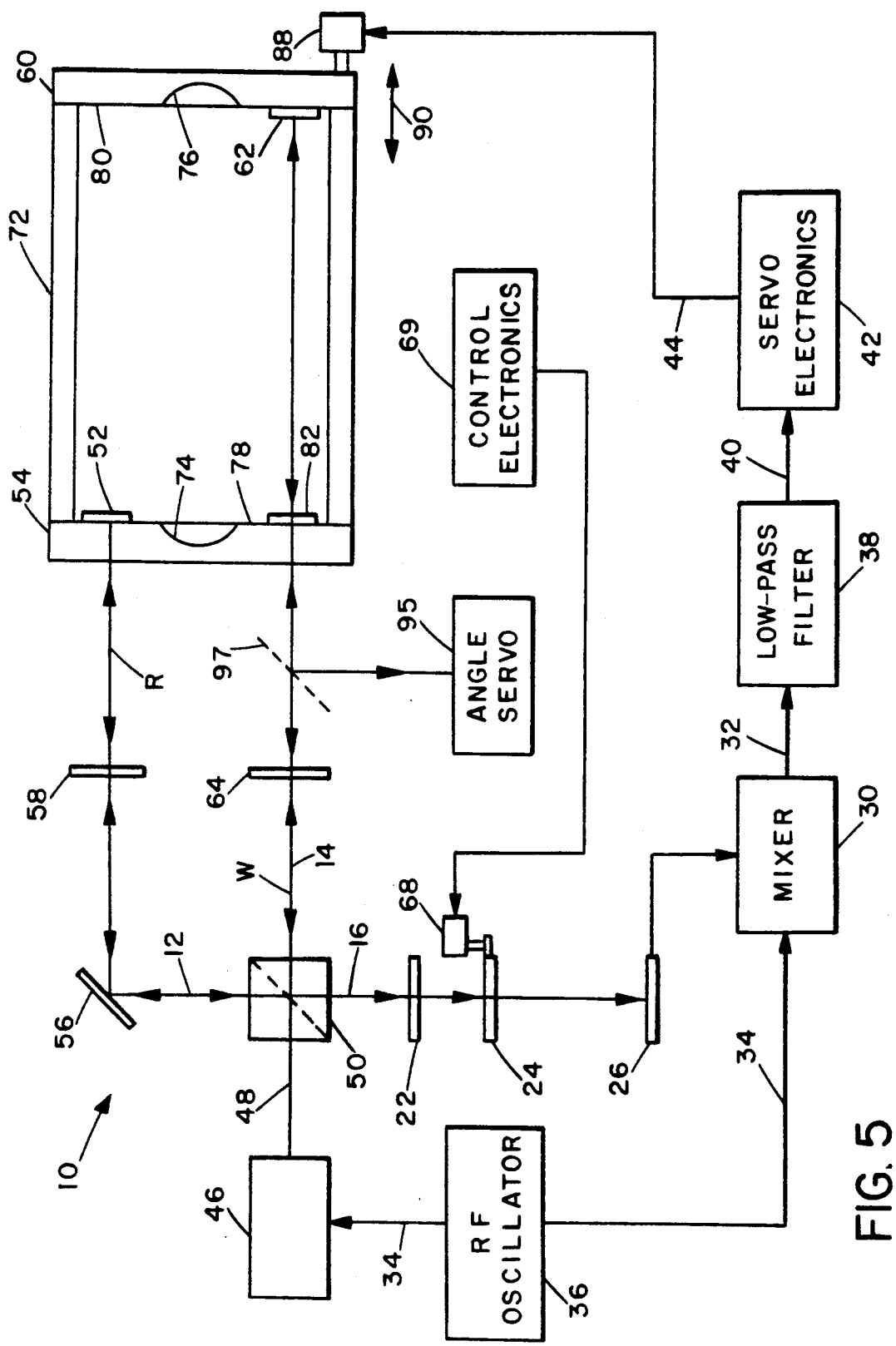
FIG. 5 is a schematic plan view of the motion and control apparatus of the present invention and Fabry-Perot optical cavity shown in FIG. 4.
Figure 6:
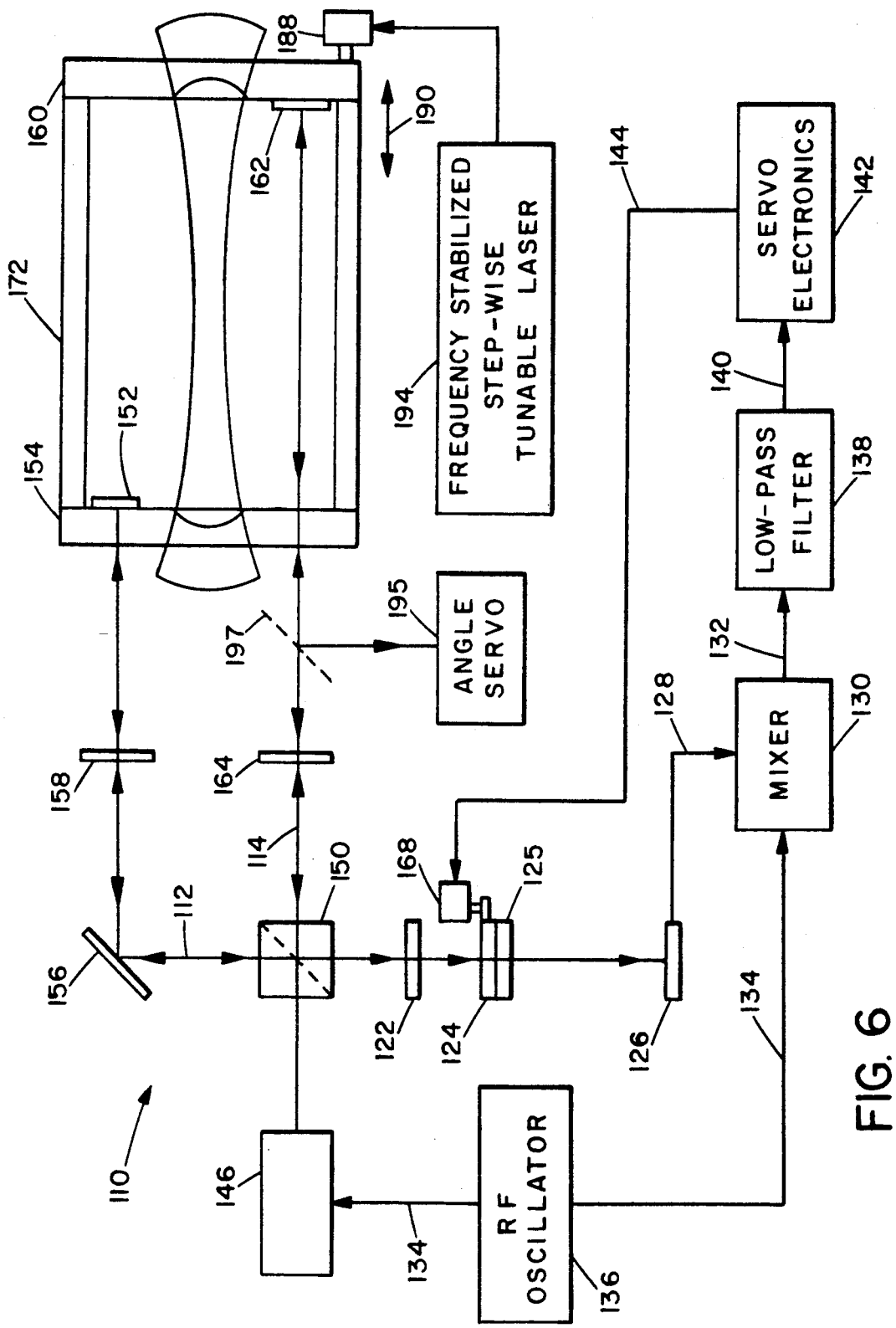
FIG. 6 is a schematic plan view of the motion and control apparatus of the present invention being used in conjunction with a tuned Fabry-Perot optical cavity to produce circular optical encoders.

The rotational and translation motion and control apparatus 10 according to the present invention and briefly described above can be used in a wide range of devices, some of which are illustrated in FIGS. 4–7 and described in detail below. For example, if the moveable mirror 62 is part of an optical interferometer, such as the optical interferometer shown in FIGS. 4 and 5, this invention provides a highly accurate and precise means for controlling the cavity length of the interferometer. Conversely, a stable cavity whose length is servoed to a frequency stabilized, step-wise tuneable laser by means well-known in the art and as shown in FIG. 6, can be used in conjunction with the method and apparatus of this invention to provide accurate, step-wise rotational control for fabricating circular optical encoders. Finally, if the mirror 62 is attached to a moving platform of the type shown in FIG. 7, this invention can achieve the precise platform control required for applications such as optical nanolithography.

Referring now to FIGS. 4 and 5, with occasional reference back to FIGS. 1 and 2, the motion and control apparatus 10 of the present invention is described in detail as it is used to precisely control the cavity length of a Fabry-Perot interferometer 72. Essentially, the spherical mirror Fabry-Perot interferometer 72 comprises two opposed cavity mirrors 54 and 60 that are coated to have spherical reflecting surfaces 74, 76, respectively, each spherical reflector 74, 76 being surrounded by a flat reflecting annulus 78, 80, respectively. There is no relative motion between the respective adjacent spherical and flat reflectors that comprise each cavity mirror 54, 60 at each end of the cavity, although the cavity mirrors 54, 60 themselves are moveable with respect to each other. The cavity input mirror 54 is also coated to have a transmitting spot 82 on its annulus 78 as well as a reflecting spot 52. A reflective spot 62 is provided on moveable cavity mirror 60, which corresponds in function to the moveable mirror 62 described above for FIG. 3.

A radiation source, such as laser 46, capable of producing coherent, linearly polarized light beams having relatively high frequencies ω, uses beat signal 34 from RF oscillator 36 to increase the frequency of the working beam component 14 by a relatively small amount Ω, so that the frequency of the working beam component 14 is now ω+Ω. Radiation source 46 also contains the necessary components (not shown) to orient the polarizations of the reference beam 12 and working beam 14 orthogonal to each other, as was described above.

Polarizing beam splitting cube 50 separates the reference beam 12 and the working beam 14 from single beam 48 by reflecting reference beam 12, which is polarized vertically, as indicated by arrows 27 in FIG. 4, and transmitting working beam 14, which is orthogonally polarized, as indicated by arrows 29 in FIG. 4. Reference beam 12 is directed to reflecting portion 52 on cavity mirror 54 via mirror 56 and ¼-wave retarder 58. Reference beam 12 is then reflected back along its original path to beam splitter cube 50. As mentioned above, the ¼-wave retarder plate 58, rotates the plane of polarization of beam 12 after two passes, so that the plane of polarization is rotated 90° by the time beam 12 returns to beam splitter cube 50. Since reference beam 12 is now polarized perpendicular to its original orientation, it is transmitted by cube 50, where it is recombined with working beam 14, into a combined beam 16.

Working beam 14 passes through ¼-wave retarder 64 and transmitting spot 82 on cavity mirror 54 before being reflected off the reflective portion 62 of moveable cavity mirror 60. The ¼-wave retarder 64 also converts the polarization of working beam 14 with each pass, so that the polarization orientation of beam 14 has been rotated 90° by the time beam 14 returns to beam splitter cube 50, where it is reflected and recombined with reference beam 12 to form combined beam 16. As described above, combined beam 16 now comprises the reference beam 12 that has traveled over fixed path length R, and working beam 14 that has traveled a variable path length W (FIG. 5).

The orthogonally linearly polarized components 12 and 14 of beam 16 are now converted to circular polarization by retarder 22, as shown in FIG. 1. Referring back to FIG. 4, for each component beam 12, 14 of beam 16, the rotatable linear analyzer 24 transmits the instantaneous projections of the fast and slow components, i.e., those components parallel and orthogonal to the fast axis 70 of retarder 22, of the respective polarizations of beams 12, 14. The magnitudes of the fast and slow components of the respective beams transmitted by linear analyzer 24 depend on the particular angular orientation θ of the transmission axis 66 of analyzer 24 with respect to the fast axis 70 of retarder 22. Thus, rotation of the linear analyzer 24 by actuator 68 advances the phase of one transmitted wave and retards the phase of the other, resulting in an overall phase shift Φ of the RF beat signal (FIG. 2).

To further enhance the function and operability of this invention, an angle sensitive servo system 95 (FIG. 5), such as the type described in my U.S. Pat. No. 4,662,750, could be optionally used in conjunction with a beam splitter 97 to remove any angular perturbations that might be introduced during the linear translation of cavity mirror 60. The addition of such an angle sensitive servo system, such as servo system 95, would be advantageous, since it is usually very difficult to translate a moving mirror, such as mirror 60, in an exactly parallel fashion. The angle servo system 95 thus compensates for any non-parallel motion of the mirror 60.

An alternate embodiment 110 rotational and translational motion and control method and apparatus according to this invention is shown in FIG. 6. This alternate embodiment 110 is essentially the reverse application of the preferred embodiment 10 described above. That is, the motion control apparatus 110 uses a stepwise length change in a Fabry-Perot cavity 172 to provide the highly accurate rotational control required for the fabrication of circular optical encoders. Instead of being used to control the linear translation of a moveable mirror, in this embodiment 110, the servo signal 144 from the servo electronics 142 is used to control the rotational servo 168, which controls the orientation angle $\theta$ of analyzer 124 and, therefore, the encoder blank 125 attached to analyzer 124. The length of the working cavity of Fabry-Perot cavity 172 is controlled by a linear actuator 188 that is driven by a frequency stabilized, step-wise tuneable laser 194, as is well-known. Such frequency stabilized, step-wise tuneable lasers, such as laser 194, are well-known in the art and will not be described in further detail. Moreover, in this embodiment 110, the laser 194 and linear actuator 188 are set-up such that the frequency change for each step is equal to the cavity free spectral range (i.e., the frequency change for one cavity order) divided by the integer number of steps desired for half of the encoder circle. Thus, a one-step change in frequency will result in a one-step rotation of the analyzer 124, thus it will also result in a corresponding one-step rotation of encoder 125. Successive steps through two cavity orders positions the encoder 125 for the desired marks around the full circle. Here again, an angle servo 195 and beam splitter 197 may optionally be added to remove any angular perturbations that might result from the displacement of cavity mirror 160.

Figure 7:
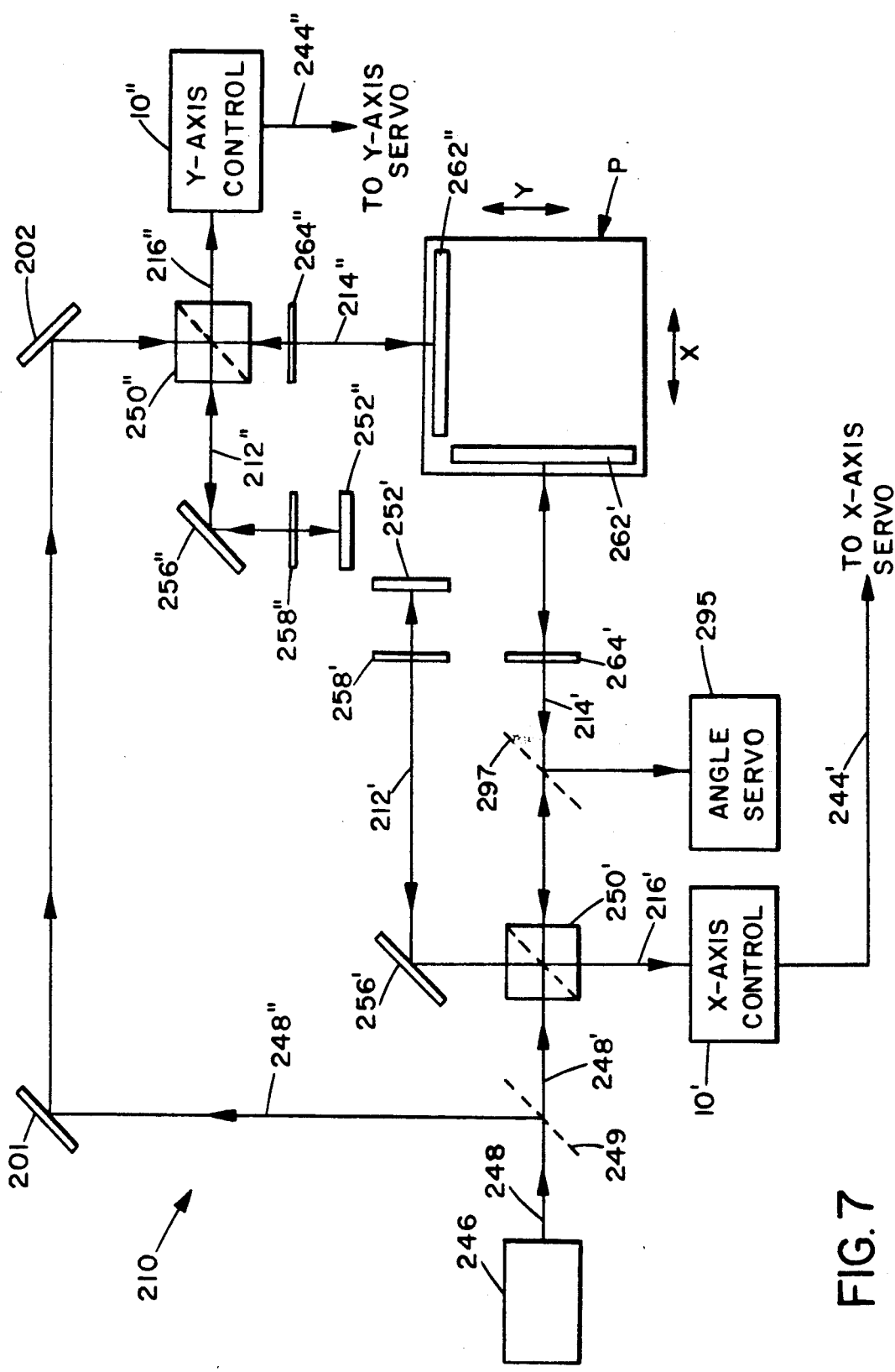
FIG. 7 is a schematic diagram of the rotational and translational motion and control apparatus of the present invention being used to control the X and Y position of a moving platform of the type used in optical nanolithography for manufacturing semiconductor chips.

Another application 210 of the rotational and translational motion and control method and apparatus 10 is shown in FIG. 7. In this application, two (2) rotational and translational motion and control correlators are used to precisely control the X-Y position of a moving platform P, such as would be used in optical nanolithography for manufacturing semiconductor chips. A first motion and control correlator 10' is used for the X direction displacement and a second motion and control correlator 10" is used for the Y direction displacement of the platform P. The input beam 248 comprising superimposed reference beam 212 and working beam 214, is split by beam splitter 249 into two portions 248' and 248", which are used for the X and Y displacements, respectively. Beam 248' is directed to beam splitter 250', which functions exactly like beam splitter 50 shown in FIGS. 1, 4, and 5. Similarly, mirror 256' and retarder 258' function as they did for the first embodiment 10 shown in FIGS. 4 and 5. A stationary mirror 252' reflects beam 212' back to beam splitter cube 250' via ¼ wave retarder 258'. Working beam 214' similarly passes through retarder 264', reflects off mirror 262', and passes through retarder 264' again, before being reflected by beam splitter cube 250' into a combined beam 216', which is then analyzed by rotational and translational motion and control apparatus 10'. The motion and control apparatus 10' then controls the position of platform P in the X direction via a suitable linear servo means (not shown).

Beam 248" for the Y displacement is directed to beam splitter cube 250" via mirrors 201 and 202, where it is split into a reference beam 212" and a working beam 214". Reference beam 212" is directed to stationary mirror 252" via mirror 256" and retarder 258". Similarly, working beam 214" passes through retarder 264" before being reflected off of mirror 262". Beam splitter cube 250" recombines the beams into beam 216". Beam 216" is then analyzed by rotational and translational motion and control apparatus 10", which controls the position of platform P in the Y direction via a linear servo (not shown).

As before, a suitable angle servo system 295 could be used in conjunction with beam splitter 297 to remove any angular perturbations occurring during the movement of the platform P in the X and Y directions. Note that, the servo system 295 could be used with beam 214" (i.e., the beam used for the Y displacement) with equal effectiveness. Therefore, using the X-axis signal from 10' to servo the X displacement and the Y-axis signal from 10" to servo the Y displacement, and the angle servo 297 to remove any angular perturbations, the rotation of the linear analyzers in 10' and 10" will move the platform P to any point in the X-Y plane with a precision and repeatability of about a microfringe, i.e., $3 \times 10^{-7}$ micron for visible light. The accuracy, as opposed to precision and repeatability, is also determined by the flatness of the mirrors 262' and 262". Currently, it is possible to manufacture mirrors with a flatness of about 1/200 fringe, or $10^{-3}$ micron, which would yield a platform positioning accuracy of about $1.5 \times 10^{-3}$ micron with the above platform.

The foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to as falling within the scope of the invention as defined by the claims which follow.

The embodiments of the invention in which an exclusive property or privilege is claimed are defined as follows:

1. Apparatus for correlating rotational motion with linear translational motion comprising:
    electromagnetic radiation producing means for producing a first beam component propagated in a first optical path having a first optical path length, said first beam component being linearly polarized in a first plane, and a second beam component propagated in a second optical path having a second optical path length, said second beam component being polarized in a second plane that is orthogonal to said first plane;
    linearly moveable optical path length changing means positioned in said first optical path for changing the length of said first optical path;
    beam combining means for combining said first and second beam components into a composite beam propagated along a composite beam path;
    quarter-wave retarder means positioned in said composite beam path for converting said first beam component and said second beam component to circular polarized, but with respectively opposite orientation such that one of said first and second beam components is right-circular polarized and the other is left-circular polarized;

rotatable linear polarizer means positioned in said composite beam path for inducing a phase shift between said first and second beam components, the extent of said phase shift being variable by rotation of said linear polarizer means;

photodetector means for converting energy in said composite beam to an electrical signal with a beat frequency having a phase shift that is a function of any difference between the length of said first and second optical paths and the rotation of said linear polarizer means;

linear servo means connected to said optical path length changing means for moving said optical path changing means in such a manner as to change the length of said first optical path; and electronic control means connected to said electrical signal and to said linear servo means for actuating said linear servo means to move said optical path changing means in response to rotation of said linear polarizer means.

2. Interferometer apparatus for creating and detecting a phase shift in an intensity variation in relation to a variation in optical path length of a working beam of linearly polarized coherent radiation having a variable optical path length with respect to a reference beam of linearly polarized coherent radiation having a constant optical path length, wherein said working beam and said reference beam have different frequencies, are orthogonally linearly polarized, and are superimposed, comprising:

retarder means having a fast axis and positioned in the path of the superimposed linearly polarized working beam and linearly polarized reference beam for converting the linearly polarized working beam into a circularly polarized working beam and for converting the linearly polarized reference beam into a circularly polarized reference beam, such that said circularly polarized working beam and said circularly polarized reference beam have circular polarizations of opposite hands and are also superimposed;

rotatable linear analyzer means having a transmission axis oriented at an angle $\theta$ from the fast axis of said retarder means, said rotatable linear analyzer means being positioned in the path of said superimposed circularly polarized working beam and circularly polarized reference beam for producing an analyzed beam having an intensity that changes at a beat frequency and a phase shift, said phase shift being related to the optical path length of the working beam in relation to the reference beam and on the angle $\theta$;

servo mirror means positioned in the variable optical path of said linearly polarized working beam for reflecting and directing said linearly polarized working beam toward said retarder means; and servo control means responsive to said phase shift for activating said servo mirror to adjust said variable optical path length.

3. The interferometer apparatus of claim 2, including radiation sensitive detector means positioned in the path of said analyzed beam for detecting the beat frequency and phase shift in said analyzed beam and for generating signal data comprising information related to the beat frequency and the phase shift in said analyzed beam.

4. The interferometer apparatus of claim 2, wherein said servo control means comprises:

oscillator means for generating an oscillator signal having a frequency that is equal to the difference in frequency between said working beam and said reference beam, and wherein said oscillator signal has a constant oscillator phase shift;

mixer means connected to said radiation sensitive detector means and to said oscillator means for mixing the signal from said radiation sensitive detector means with said oscillator signal to produce a mixed signal related to the phase shift in said analyzed beam; and servo electronics means connected to said mixer means for generating a servo signal related to said mixed signal for translating said servo mirror means.

5. The interferometer apparatus of claim 4, including rotational servo motor means connected to said rotatable linear analyzer means for selectively rotating the transmission axis of said rotatable linear analyzer means with respect to the fast axis of said retarder means.

6. The interferometer apparatus of claim 5, including rotational servo control means connected to said radiation sensitive detector means and to said rotational servo motor means for selectively activating said rotational servo motor means to rotate said analyzer.

7. Apparatus for detecting changes of path length of a working beam of polarized radiation with respect to a reference beam of polarized radiation, wherein the working beam and the reference beam have different frequencies, orthogonal linear polarizations, and are superimposed, comprising:

analyzation means for converting the linear polarized working beam and the linear polarized reference beam into a circularly polarized working beam and a circularly polarized reference beam, such that said circularly polarized working beam and said circularly polarized reference beam have circular polarizations of opposite hands and are also superimposed, and analyzing said circularly polarized working beam and said circularly polarized reference beam to produce an analyzed beam;

radiation sensitive detector means positioned in the path of said analyzed beam for detecting a phase change in the analyzed beam;

optical path length changing means;

linear servo means connected to said optical path length changing means for moving said optical path changing means in such a manner as to change the path length of said working beam; and electronic control means responsive to said phase change to move said optical path changing means in response to rotation of said analyzation means.

8. Interferometer apparatus for creating and detecting an intensity variation in relation to a variation in optical path length of a working beam of linearly polarized coherent radiation with respect to a reference beam of linearly polarized coherent radiation having a constant optical path length, wherein said working beam and said reference beam are orthogonally linearly polarized, and are superimposed, comprising:

retarder means having a fast axis, said retarder means being positioned in the path of the superimposed linearly polarized working beam and linearly polarized reference beam for converting the linearly polarized working beam into a circularly polarized working beam and for converting the linearly polarized reference beam into a circularly polarized reference beam, such that said circularly polarized working beam and said circularly polarized reference beam have circular polarizations of opposite hands and are also superimposed;

rotatable linear analyzer means having a transmission axis oriented at an angle $\theta$ from the fast axis of said retarder means, said rotatable linear analyzer means being positioned in the path of said superimposed circularly polarized working beam and circularly polarized reference beam for producing an analyzed beam having an intensity variation, said intensity variation being related to the optical path length of the working beam in relation to the reference beam and on the angle $\theta$;

linearly movable optical path length changing means;

linear servo means connected to said optical path length changing means for moving said optical path length changing means in such a manner as to change the optical path length of said working beam; and control means responsive to said intensity variation for actuating said linear servo means to move said optical path changing means in response to rotation of said rotatable linear analyzer means.

9. Apparatus for correlating rotational motion and translational motion, comprising, electromagnetic radiation producing means for producing a working beam of coherent radiation and a reference beam of coherent radiation, said working beam and reference beam having phase coherence with each other and respective linear polarization in planes oriented orthogonal to each other;

means for directing said working beam through a variable optical path length and for directing said reference beam through a fixed optical path length;

beam recombining means positioned in the path of said working beam and said reference beam after said beams have traveled over said variable optical path length and said fixed optical path length, respectively, for recombining said working beam and said reference beam;

analyzer means positioned in the path of said recombined said working beam and reference beam for analyzing the working beam and said reference beam to produce and analyzed beam having a beat frequency and having a phase shift, said phase shift being related to said variable optical path length, said analyzer means including retarder means having a fast axis for converting the linear polarized working beam and the linear polarized reference beam into a circular polarized working beam and a circular polarized reference beam, respectively, and rotatable linear polarization analyzer means having a transmission axis oriented at angle $\theta$ from the fast axis of said retarder means for transmitting portions of said analyzed beam dependent on the angle $\theta$;

radiation sensitive detector means positioned in the path of said analyzed beam for detecting the beat frequency and the phase shift in said analyzed beam and for generating signal data comprising information related to the phase shift in said analyzed beam;

servo mirror means positioned in said variable path length of said linearly polarized working beam for reflecting and directing said linearly polarized working beam produced by said radiation producing means towards said beam recombining means; and servo control means connected to said radiation sensitive detector means and to said servo mirror means for activating said servo mirror means to translate in response to the phase shift information in the signal data from said radiation sensitive detector means.

10. The apparatus of correlating rotational motion and translational motion of claim 9, wherein said servo control means comprises:

oscillator means for generating an oscillator signal having a frequency that is equal to the difference in frequency, between said working beam and said reference beam;

mixer means connected to said radiation sensitive detector means and to said oscillator means for mixing the signal from said radiation sensitive detector means with said oscillator signal to produce a mixed signal related to the phase shift in said analyzed beam; and servo electronics means connected to said mixer means for generating a servo signal related to said mixed signal for translating said servo mirror means.

11. The apparatus for correlating rotational motion and translational motion of claim 10, including rotational servo motor means connected to said rotatable linear analyzer means for selectively rotating the transmission axis of said rotatable linear analyzer means with respect to the fast axis of said retarder means.

12. The apparatus for correlating rotational motion and translational motion of claim 11, including rotational servo control means connected to said radiation sensitive detector means and to said rotational servo motor means for selectively activating said rotational servo motor means to rotate said analyzer.

13. A method for creating and detecting a phase shift in an intensity variation in relation to a variation in optical path length of a working beam of linearly polarized coherent radiation having a variable path length with respect to a reference beam of linearly polarized coherent radiation having a constant optical path length, wherein said working beam and said reference beam have different frequencies and are phase coherent, are orthogonally linearly polarized, and are superimposed, comprising the steps of:

converting the linearly polarized working beam into a circularly polarized working beam and converting the linearly polarized reference beam into a circularly polarized reference beam such that said circularly polarized working beam and said circularly polarized reference beam have circular polarization of opposite hands and are superimposed;

analyzing said superimposed circularly polarized working beam and said circularly polarized reference beam to produce an analyzed beam having an intensity that changes at a beat frequency and a phase shift, said phase shift being related to the optical path length of the working beam in relation to the reference beam;

detecting said phase shift; and changing the variable optical path length of said working beam in response to said detected change in said phase shift.

14. A method for correlating rotational motion and translational motion, comprising the steps of:

generating a working beam of coherent radiation and a reference beam of coherent radiation, said working beam and reference beam having phase coherence, orthogonal linear polarization orientations, and different frequencies;

directing said working beam through a variable optical path length and directing said reference beam through a fixed optical path length;

recombining said working beam and said reference beam after said beams have traveled over said variable optical path length and said fixed optical path length, respectively, to form a recombined beam;

analyzing said recombined said working beam and reference beam to produce an analyzed beam having a beat frequency and having a phase shift, said phase shift being related to said variable optical path length and the rotation angle of a linear analyzer;

detecting said phase shift; and changing the variable optical path length in relation to a change in said phase shift.

15. Interferometer apparatus for creating and detecting a phase shift in an intensity variation in relation to a variation in optical path length of a working beam of linearly positioned coherent radiation with respect to a reference beam of linearly polarized coherent radiation having a constant optical path length, wherein said working beam and said reference beam having different frequencies and are phase coherent, are orthogonally linearly polarized, and are superimposed, comprising:

retarder means positioned in the path of the superimposed linearly polarized working beam and linearly polarized reference beam for converting the linearly polarized working beam into a circularly polarized working beam and for converting the linearly polarized reference beam into a circularly polarized reference beam, such that said circularly polarized working beam and said circularly polarized reference beam have circular polarizations of opposite hands and are also superimposed;

rotatable linear analyzer means positioned in the path of said superimposed circularly polarized working beam and circularly polarized reference beam for producing an analyzed beam having an intensity at a detector that changes at a beat frequency and a phase shift, said phase shift being related to the optical path length of the working beam in relation to the reference beam and the rotation angle of said rotatable linear analyzer;

linearly movable optical path length changing means;

linear servo means connected to said optical path length changing means for moving said optical path changing means in such a manner as to change the optical path length of the working beam; and electronic control means responsive to said phase shift and to said linear servo means for actuating said linear servo means to move said optical path changing means in response to rotation of said rotatable linear analyzer means.

* * * * *

UNITED STATES PATENT AND TRADEMARK OFFICE
CERTIFICATE OF CORRECTION

PATENT NO.   :   5,155,550

DATED        :   October 13, 1992

INVENTOR(S)  :   R. L. Barger

It is certified that error appears in the above-identified patent and that said Letters Patent is hereby corrected as shown below:

Column 17, claim 15, line 25 "positioned" should be

--polarized--.

Signed and Sealed this

Seventh Day of December, 1993

Attest:

BRUCE LEHMAN

*Attesting Officer*           *Commissioner of Patents and Trademarks*